United States Patent [19]

Guignard et al.

[11] Patent Number: 4,557,346
[45] Date of Patent: Dec. 10, 1985

[54] STEERING AND DRIVE SYSTEM

[75] Inventors: Paul C. Guignard, Concord; Michael D. Ream, Lafayette, both of Calif.

[73] Assignee: Up-Right, Inc., Berkeley, Calif.

[21] Appl. No.: 590,333

[22] Filed: Mar. 16, 1984

[51] Int. Cl.$^4$ .............................................. B62D 5/06
[52] U.S. Cl. ....................................... 180/242; 180/154
[58] Field of Search ............... 180/154, 155, 156, 157, 180/242

[56] References Cited

U.S. PATENT DOCUMENTS 3,480,100 11/1969 Gaulke ................................. 180/155
4,219,094 8/1980 Sturgill ............................ 180/242 X

OTHER PUBLICATIONS

Spacesaver 30-100 Cushion Tire Trucks, Hyster Company, Danville, IL, Dec. 1980.

Primary Examiner—Richard E. Gluck
Attorney, Agent, or Firm—Phillips, Moore, Lempio & Finley

[57] ABSTRACT

A steering and drive system for a four-wheeled vehicle (10) with two non-steering and non-driving wheels (16, 17) at one end of the vehicle, in which the system includes two wheel brackets (23, 32) at the other end of the vehicle, each wheel bracket having a motor-driven wheel (18, 19) mounted thereon, and each wheel bracket being mounted on the vehicle for turning about a vertical axis which passes through the angle of rotation of the wheel thereon, and a double-ended hydraulic cylinder (35) having a housing (36) fixed to the frame (15) of the vehicle and a reciprocating piston (41) whose ends are connected by links (47, 53) to the two wheel brackets to provide a tie between the wheels and Ackerman steering.

5 Claims, 6 Drawing Figures

STEERING AND DRIVE SYSTEM

TECHNICAL FIELD

This invention relates to steering systems for four-wheel vehicles, and particularly for such vehicles as carry an elevatable work platform.

BACKGROUND OF THE INVENTION

At the present time there are a number of relatively small, four-wheeled vehicles having an elevatable work platform, usually for one or two workmen. Such vehicles are commonly used in warehouses for stock work and in buildings for replacement of ceiling light bulbs, or similar maintenance. Typically these vehicles are relatively low in speed and quite maneuverable so that they can be driven easily through narrow aisles and doorways.

It is desirable to provide a steering system for the two steering wheels of such a vehicle which can be remotely operated by a workman on the platform, which is inexpensive, which has a minimum of parts, and which is easy to maintain in operating condition.

It is desirable also to apply driving power to the steering wheels. For maneuverability, the steering system should provide a short turning radius, which means that the steering system should not interfere, during turning, with the power system for driving the wheels.

To avoid scuffing or slippage of the steering wheels as the vehicle is turning, the steering wheels should have an Ackerman operation, with the steering wheels turning through different amounts as the vehicle turns, and with the axes of all four wheels of the vehicle intersecting at a common point.

These vehicles are typically designed with power to the wheels being decreased when the work platform is elevated, so that the maximum speed of the vehicle is decreased at such time. As a consequence, it is desirable that the steering systems permit easy turning even though the power is decreased.

It is also desirable to provide a steering system which maintains full stability at all times and without a reduction in the base support area as the vehicle turns to go around a corner.

STATEMENT OF THE INVENTION

The present invention is directed towards providing a steering and drive systems which fulfills the above mentioned desires.

In general, the present invention provides a steering and drive system for a four-wheeled vehicle with two non-steering and non-driving wheels at one end of the vehicle, in which the steering and drive system includes two wheel brackets at the other end of the vehicle, each wheel bracket having a motor driven wheel mounted thereon and each wheel bracket being mounted on the vehicle for turning about a vertical axis passing through the axis of rotation of the wheel thereon, and a double-ended hydraulic cylinder having a housing fixed to the frame of the vehicle and a reciprocating piston whose ends are connected by links to the two wheel brackets.

Other aspects and advantages of the invention will be set forth in the course of the following detailed description.

BRIEF DESCRIPTION OF THE DRAWINGS

In the drawings, forming a part of this application, and in which like parts are designated by like reference numerals throughout the same.

DESCRIPTION OF THE PREFERRED EMBODIMENT

Figure 1:
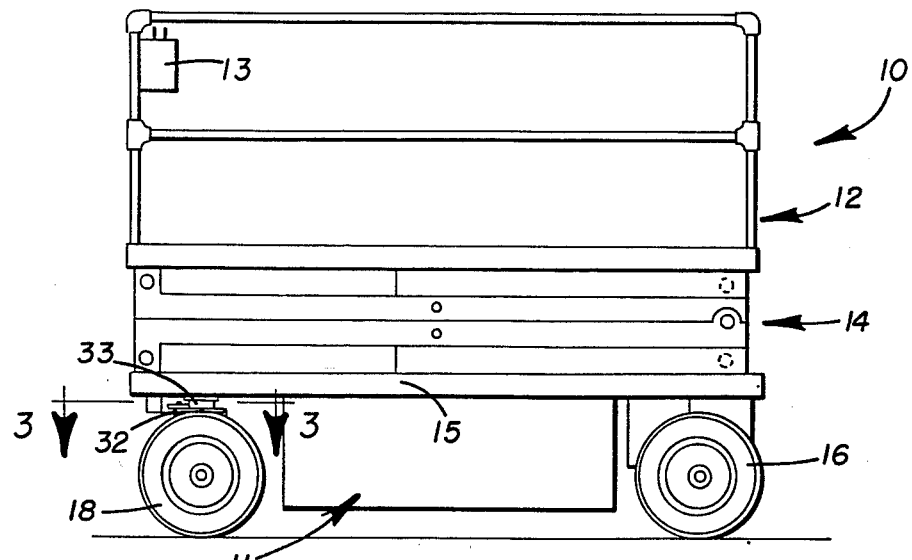
FIG. 1 is a side elevational view of a mobile work platform unit utilizing the steering and drive system of the present invention.

Referring now to the drawings, wherein a preferred embodiment of the invention is shown, the mobile work platform 10 includes a wheeled base 11 and a work platform 12. A control panel 13 on the work platform 12 includes manually operable controls for activating the scissors-lift assembly 14 to raise and lower the work platform 12 relative to the wheeled base 11.

The wheeled base 11 includes a generally horizontal frame 15 and has a pair of non-steering and non-driving wheels 16 and 17 mounted at one end of the frame, and a pair of powered steering wheels 18 and 19 at the other end of the frame.

The right front wheel 18 is mounted on the rotor of hydraulic motor 21 which is fixed to the vertical flange 22 of L-shaped wheel bracket 23. Hydraulic motor 21 has standard fittings 24 for hoses which connect to the hydraulic system (FIG. 3) of the wheeled base 11 so that the wheel 18 can be power driven.

Figure 2:
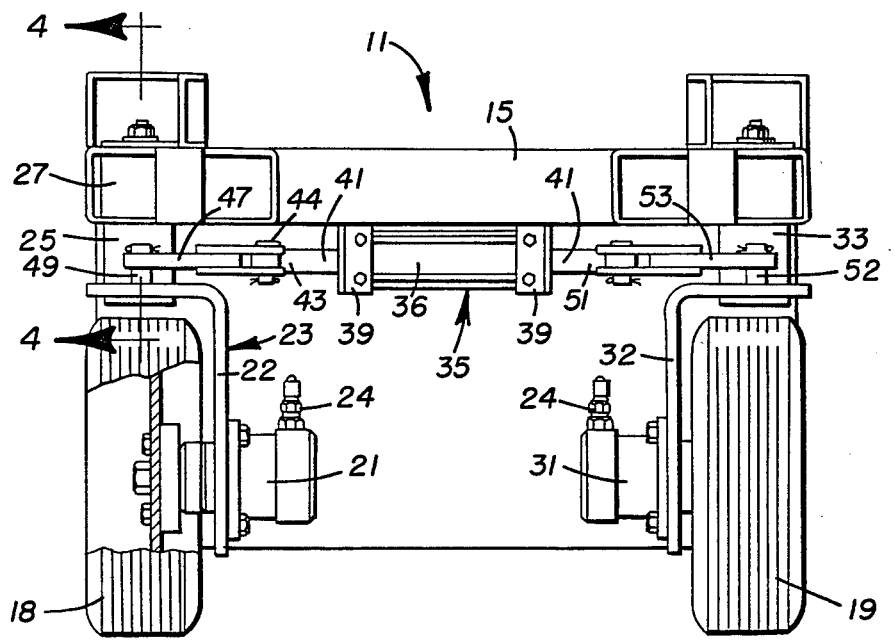
FIG. 2 is a front elevational view of the unit of FIG. 1.
Figure 4:
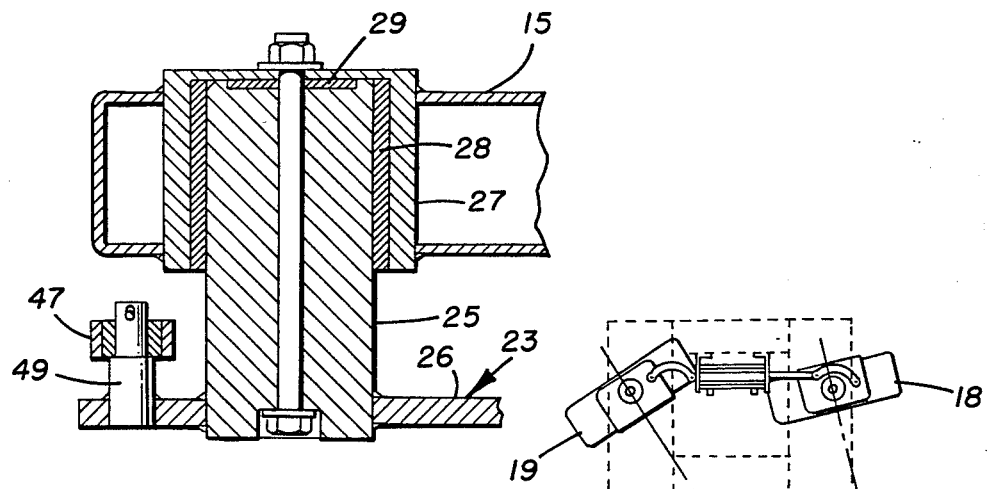
FIG. 4 is a sectional view, in elevation, and taken on line 4—4 of FIG. 2, showing the manner in which the wheel brackets are mounted to the frame of the wheeled base.

As best seen in FIGS. 2 and 4, the wheel bracket 23 has an upstanding spindle 25 on the horizontal flange 26 of the bracket which extends upwardly into the cup-shaped socket 27 welded to frame 15. A sleeve bearing 28 and a disc bearing 29 are provided to enable the spindle 25 to rotate about its vertical axis in socket 27. The vertical axis of the spindle 25 passes through the horizontal axis of rotation of wheel 18.

In like manner, the left front wheel 19 is fixed to the rotor of the hyraulic motor 31 that is mounted on wheel bracket 32, and the wheel bracket 32 is mounted by spindle 33 to frame 15 for rotation about a vertical axis which passes through the center of wheel 19.

For steering purposes, a double-ended hydraulic cylinder 35 is provided, the housing 36 of which is rigidly secured to frame 15 by brackets 37 at each end of housing 36 and tie rods 28 extending between the brackets 37. Brackets 37 are bolted to brackets 39 which are firmly connected to frame 15. Hydraulic cylinder 35 has a piston rod 41 extending from both ends of housing 36 and two hose fittings 42 for connecting to the hydraulic system so that the piston rod can be moved axially in a desired direction. The right end 43 of piston rod 41 is pivotally connected by pin 44 to one end 46 of curved link 47, and the other end 48 of link 47 is pivotally connected to upstanding pin 49 which is fixed on the horizontal flange 26 of wheel bracket 23. The vertical axes of spindle 25 and pin 49 are spaced apart and in a plane which includes the center of wheel 18, and the horizontal axis of rotation of wheel 18 is perpendicular to that plane.

Similarly, the other end 51 of piston rod 41 is connected to pin 52 on wheel bracket 32 by curved link 53.

Figure 3:
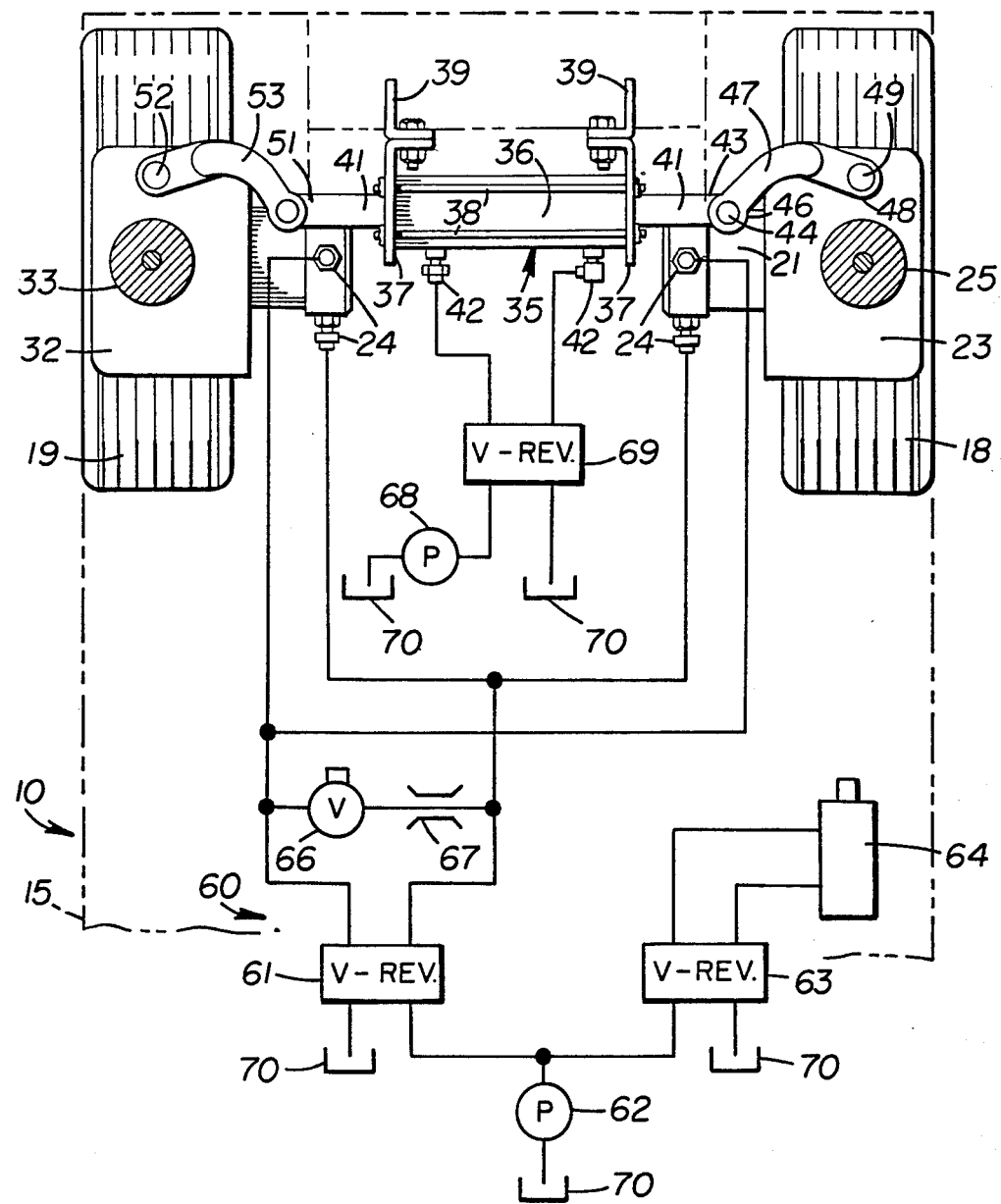
FIG. 3 is a sectional view, taken on line 3—3, of FIG. 1 showing, in plan, the wheeled base of the mobile work platform unit.

FIG. 3 illustrates schematically a simplified hydraulic system 60 which may be used in the present invention. Hydraulic motors 21 and 31 are connected by a reversing valve 61 to the hydraulic pump 62, with valve 61 being manually operable to deliver hydraulic fluid to the motors to drive them forth forwardly or rearwardly as desired. Pump 62 is also connected by manually operable reversing valve 63 to the hoist cylinder 64 so that the scissors-lift assembly can be extended upwardly or retracted downwardly. A switch and electrical circuit (not shown) will normally be provided and operable upon a predetermined amount of upward movement of the work platform 12 to energize solenoid valve 66 to open position so that hydraulic fluid being delivered to the motors will be partially bypassed through flow restrictor 67 to prevent full power from being then applied to the motors 21 and 31.

A second hydraulic pump 68 is connected by the manually operable reversing valve 69 to the steering cylinder 35.

The controls for reversing valves 61, 63 and 68 are located at the control panel 14 on the work platform, while the pumps 62 and 68 and the hydraulic fluid reservoir 70 are carried by the wheeled base 11.

Steering is accomplished by controlling the direction of flow of hydraulic fluid to the ends of steering cylinder 35. In FIG. 3, the steering piston 41 is centered with the steering wheels 18 and 19 being held in a straight ahead position. Manipulation of the reversing valve 69 so that piston 41 moves rightwardly will cause piston 41 and link 47 to push the pin 49 on wheel bracket 23 to the right so that wheel bracket 23 and wheel 18 will rotate about the vertical axis of spindle 25. At the same time piston 41 and link 53 will pull the pin 52 on wheel bracket 32 to the right so that wheel bracket 32 and wheel 19 will rotate to the right about the axis of spindle 33.

Figure 5:
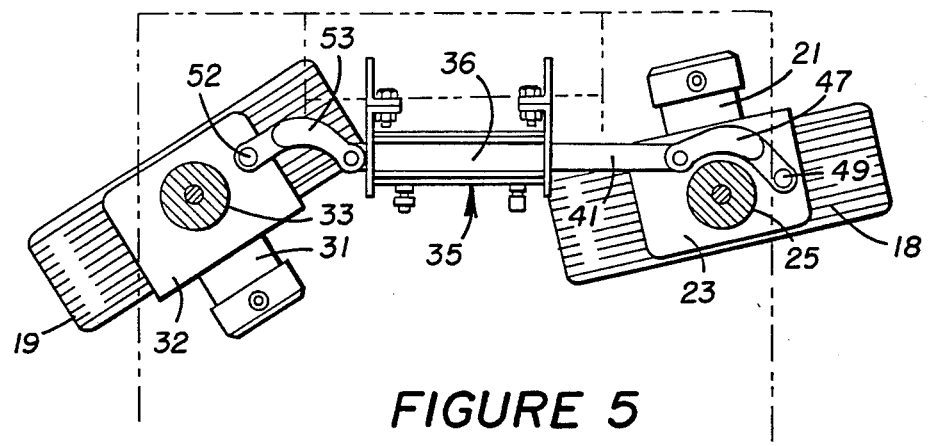
FIG. 5 is a view, similar to FIG. 3, illustrating the position of the steering elements at a maximum right turn.
Figure 6:
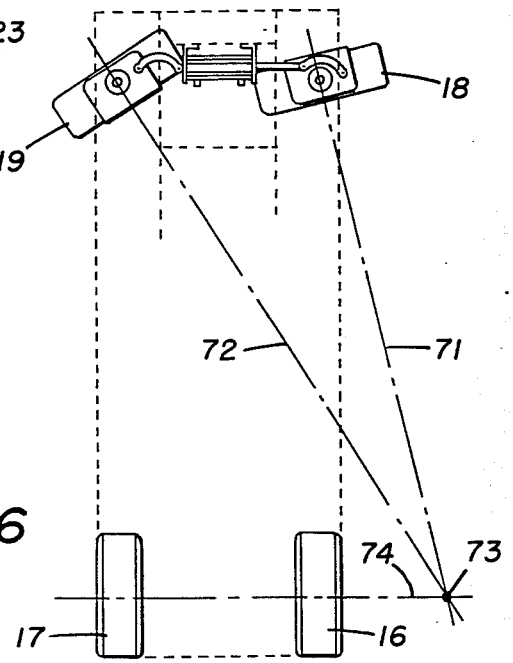
FIG. 6 is a diagram showing the position of the four wheels of the unit at a maximum right turn.

FIGS. 5 and 6 illustrates the position of the elements when piston 41 has been moved to its extreme right position. As will be noted, the right wheel has been rotated through a greater degree than the left wheel, to produce Ackerman steering, wherein the axes of rotation 71 and 72 of the two front steering wheels 18 and 19 will intersect each other at a point 73 on the axis of rotation 74 of the two rear wheels 16 and 17. With this arrangement, all four wheels will roll on circles having a common center 73 so that the wheels will roll without scrubbing during turning. In like manner, if steering piston 41 is moved to the left, the steering wheels 18 and 19 will be rotated to the left, with the left wheel 19 rotating through a greater degree than the right wheel 18.

The particular design of a system to produce proper Ackerman steering will depend upon the wheelbase, the distance between the wheel bracket spindles 25 and 33, the length of piston 41, the stroke of piston 41, the amount of offset of pins 49 and 33 from the vertical axes of spindles 25 and 33, and the amount of offset of the axis of steering cylinder 35 from the plane defined by the vertical axes of spindler 25 and 33. For a particular model vehicle, the design of the steering linkages and their placement will most easily be done in an empirical manner. In such design, the closer the point 73 is to a point midway between the rear wheels 16 and 17 on maximum movement of steering piston 41, the tighter the turn of the vehicle.

The placement of the steering cylinder 35, piston 41 and links 47 and 53 all at a level above the horizontal flanges of wheel brackets 23 and 32 enables the wheels 18 and 19 to be held together and steered without any interference with the hydraulic drive motors 21 and 31 which are mounted on the wheel brackets.

The mounting of the wheel brackets in the present invention, wherein the vertical axes of the wheel brackets spindles pass through the horizontal axes of the wheels mounted on the brackets has a distinct advantage in that the stability of the vehicle is unaffected by turning, since the horizontal spacing of the four points of contact with the floor will be the same at all times, whether the steering wheels are straight ahead or turned. In a typical king pin steering wheel linkage, wherein the steering wheels rotate about the vertical king pin axes which are horizontally offset from the centers of contact of the steering wheels with the floor, the spacing between the contact points will decrease as the wheels are turned in either direction from straight ahead. Thus, during a turn, when stability is most needed, the base support axes will decrease.

Also, in a steering system wherein the steering wheels are not driven and a turn is made with the steering wheels at a sharp angle, considerable power will be needed to turn the wheels because of the tendency for the steering wheels to scrub on the floor. In the present system, wherein each steering wheel is driven, scrubbing will be at a minimum, and the least power will be needed to make a turn.

The foregoing description of a preferred embodiment has been presented for purposes of illustration and description. It is not intended to be exhaustive or to limit the invention to the precise form described, and obviously many modifications and variations are possible in light of the above teaching. The embodiment was chosen and described in order to best explain the principles of the invention and its practical application to thereby enable others in the art to best utilize the invention in various embodiments and with various modifications as are suited to the particular use contemplated. The above description has been directed to a four-wheeled vehicle with an elevatable work platform, and in this intended use the steering and drive system fulfills the need for a remotely-controllable system which is very simple in construction, which is stable in turning and which requires minimum power for turning. However, the systems of the present invention can also be used in other vehicles wherein some or all of these advantages are needed. It is intended that the scope of the invention be defined by the claims appended hereto.

We claim:

1. A steering and drive system for a wheeled vehicle having a generally horizontal frame and a pair of non-steering and non-driving wheels at one end of said frame, said steering and drive system comprising:
   a pair of wheel brackets at the other end of said frame,
   a hydraulic motor mounted on each wheel bracket,
   a steering wheel on each wheel bracket and rotatably driven about a horizontal axis by the motor on that wheel bracket, means for mounting said wheel brackets to said frame for pivoting of said wheel brackets about spaced apart vertical axes, with the vertical axis of each wheel bracket passing through the horizontal axis of rotation of the wheel mounted thereon, a double-ended hydraulic cylinder having a housing fixed to said frame at a horizontal level above said motors and a piston extending horizontally from each end of said housing, a first link pivotally connected at one end thereof to one end of said piston and pivotally connected at the other end thereof to one of said wheel brackets at a location thereon horizontally offset from the vertical axis of that wheel bracket, a second link pivotally connected at one end thereof to the other end of said piston and pivotally connectable at the other end thereof to the other of said wheel brackets at a location thereon horizontally offset from the vertical axis of that wheel bracket.

2. A steering and drive system as set forth in claim 1, wherein said piston of said hydraulic cylinder and said links are all above the levels of said wheel brackets.

3. A steering and drive system for a wheeled vehicle having a generally horizontal frame and a pair of non-steering and non-driving wheels at one end of said frame, said steering and drive system comprising:

a pair of L-shaped wheel brackets at the other end of said frame, each said bracket having an upper horizontal flange and a vertical flange depending therefrom, a motor mounted on the vertical flange of each wheel bracket, a steering wheel on each wheel bracket and rotatably driven about a horizontal axis by the motor on that wheel bracket, means including an upstanding spindle on the horizontal flange of each wheel bracket for mounting and wheel brackets to said frame for pivoting of said wheel brackets about spaced apart vertical axes coaxial with the vertical axes of said spindles, with the vertical axis of each wheel bracket passing through the horizontal axis of rotation of the wheel mounted thereon, a double-ended hydraulic cylinder having a housing fixed to said frame and a piston extending horizontally from each end of said housing, a first link pivotally connected at one end thereof to one end of said piston and pivotally connected at the other end thereof to one of said wheel brackets at a location thereon horizontally offset from the vertical axis of that wheel bracket, a second link pivotally connected at one end thereof to the other end of said piston and pivotally connected at the other end thereof to the other of said wheel brackets at a location thereon horizontally offset from the vertical axis of that wheel bracket, each of said wheel brackets including an upstanding pin on the horizontal flange thereof, each pin being horizontally spaced from the spindle on the same wheel bracket, and said other ends of each of said first and second links being pivotally connected one each to one of said upstanding pins.

4. A steering and drive system as set forth in claim 3, wherein the vertical axes of the pin and spindle on each wheel bracket are in a plane which includes the center of the wheel mounted on that bracket, and the horizontal axis of rotation of that wheel is perpendicular to said plane, and wherein said piston is parallel to and horizontally offset from a vertical plane which includes the vertical axes of the two spindles on said wheel brackets.

5. A steering and drive system as set forth in claim 4, wherein said motors on said wheel brackets are hydraulic motors.

* * * * *